Oct. 15, 1968 L. R. KIEHART ET AL 3,405,566
ANTIBACKLASH GEARING
Filed May 15, 1967
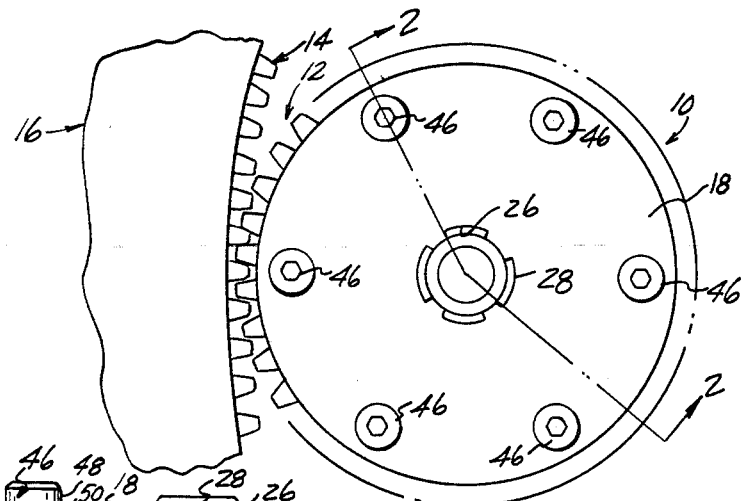
FIG. 1
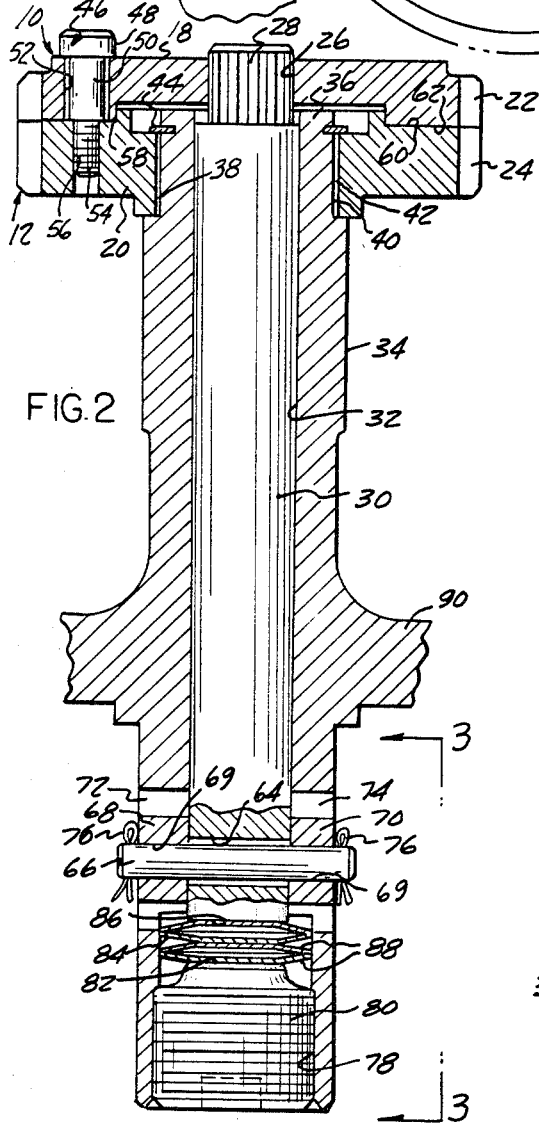
FIG. 2
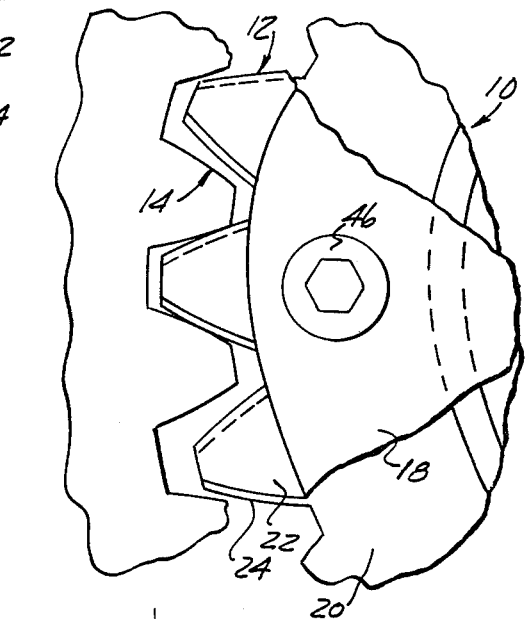
FIG. 4
FIG. 3
INVENTORS
LAWRENCE R. KIEHART
LARRY D. DOYLE
JAMES H. WALMSLEY
BY Hauke, Haase, Gifford, & Patalidis
ATTORNEYS United States Patent Office 3,405,566
Patented Oct. 15, 1968

3,405,566
ANTIBACKLASH GEARING
Lawrence R. Kiehart, Detroit, Larry D. Doyle, Roseville, and James H. Walmsley, Warren, Mich., assignors to Bauer Ordnance Company, Warren, Mich., a corporation of Michigan
Filed May 15, 1967, Ser. No. 638,455
9 Claims. (Cl. 74—440)

ABSTRACT OF THE DISCLOSURE

An antibacklash arrangement for a gear drive having a split gear forming two gear portions having a common axis and angularly positionable one with respect to the other so as to provide a controlled amount of angular separation between the teeth of one gear portion and the teeth of the other gear portion, such that a toothed member meshing with the split gear has both the leading and trailing faces of each of its teeth engaged by both the leading and trailing faces of each tooth of the gear. A spring bias provides the teeth separation in one direction, and wedge means are provided for preventing the controlled amount of separation from being decreased by relative angular motion of the gear portions under the action of reverse loads.

Background of the invention

Conventional gearing, wherein a gear is adapted to mesh and drive, or be driven by, a toothed member, which may be another gear or a straight toothed member such as a rack, generally exhibits a substantial amount of backlash. Such backlash is often necessary for proper operation of the gearing without binding or undue wear, and results from design imperfections and machine variations such as eccentricity, out of roundness, inexact center distances between elements, unequal tooth thickness of a random pattern, etc. Such variations cause a continuously variable backlash which, under certain circumstances, may become a constant backlash after the gearing elements have been operated for a "run-in" period of time.

Backlash in gearing assemblies adapted to provide reversible drive presents many inconveniences, the most important of which is lack of positioning accuracy where it is desired to drive a driven member from a predetermined start position to a precise subsequent predetermined finite position. Because of the presence of backlash in conventional gearing, when a gear driven member is driven in a predetermined direction, its final position corresponding to a predetermined position of the driving member depends upon the direction of torque transmission load and upon the original direction of motion. Consequently, where great precision is required, such as for example in machine tools and the like, displacements and loads must be always directed in the same direction if positioning precision is sought.

In addition, backlash in gearing creates noise, results in poor efficiency, may lead to vibrations at certain speed and causes hammering loads to be imposed upon the meshed teeth of the assembly components.

Antibacklash gear drive systems have been known for some time, wherein the gear portions of split gears are provided with means for angularly separating the teeth of one of the gear portions relatively to the teeth of the other gear portion, for the purpose of decreasing or supressing backlash between the driving and driven members. The angular displacement of one gear portion relatively to the other is generally provided by a spring bias, by an adjustable friction coupling as disclosed in U.S. Patent No. 1,124,107, by means of levers interconnecting the two gear portions as disclosed in U.S. Patent No. 2,640,428, or by mounting one of the gear portions on a helicoidally splined shaft, such that the axial displacement of one gear portion with respect to the other results in relative angular displacement of the corresponding portions, as disclosed in U.S. Patent No. 2,896,466.

Summary of the invention

The present invention provides for a split gear or pinion forming two substantially identical gear portions, one of which is supported by a solid shaft disposed within a hollow shaft supporting the other gear portion. One shaft is angularly urged by spring bias in rotation in one direction relatively to the other and relative angular rotation of the shafts in an opposite direction is opposed by camming means, such that no amount of shock load or reverse load results in decreasing the controlled amount of teeth separation between one gear portion and the other.

An antibacklash gearing system, according to the invention, has thus many obvious applications where it is desired to provide a reversible variable load gear drive wherein predetermined motion of the driving member produces a predetermined displacement of the driven member, irrespective of the sense or direction of motion and irrespective of the direction in which loads are being applied to the gearing. Such an antibacklash arrangement has practical applications in precision instruments, machine tools, in the ordnance art for drives for turret or cupola mounted weapons, etc.

The many advantages of the present invention will become apparent to those skilled in the art when the description of an example of a preferred embodiment thereof is read in conjunction with the accompanying drawings wherein like numerals refer to like parts and in which:

Brief description of the drawings

FIG. 1 is a plan view of a gear drive incorporating an example of antibacklash arrangement according to the present invention;

FIG. 2 is a longitudinal sectional view substantially along line 2—2 of FIG. 1;

FIG. 3 is a partial elevational view, from line 3—3 of FIG. 2; and

FIG. 4 is a fractional enlarged view of a portion of FIG. 1.

Detailed description of a preferred embodiment

An antibacklash gearing arrangement according to the principles of the present invention is shown in the drawing as consisting of a gear member 10 having spur teeth, generally indicated at 12, adapted to mesh with spur teeth 14 of a toothed member 16. Toothed member 16 may be any member capable of driving gear member 10 or capable of being driven thereby, and may consist of another gear or pinion, or a rack, or, as shown, of an annular shaped internal gear. As shown best in FIG. 2, gear member 10 is split substantially along a plane perpendicular to the axis of rotation thereof, such as to define two gear portions 18 and 20, substantially alike, and coaxially disposed side by side, such that a complete spur tooth 12 is defined by each pair of correlated spur tooth portions 22 and 24 depending respectively from gear portions 18 and 20, a plurality of pairs of correlated spur tooth portions being integrally formed on the periphery of both gear portions.

Gear portion 18 is provided with a centrally disposed splined bore 26 through which projects the correspondingly splined end 28 of a solid shaft member 30 coaxially disposed within the longitudinal bore 32 of a hollow shaft 34. Hollow shaft 34 is provided with a reduced diameter shouldered portion 36 adapted to accept the central bore 38 of gear portion 20 for rigid mounting of the gear portion 20 thereon by means such as keyways 40, keys 42 and annular retainer 44 preventing longitudinal axial displacement of gear portion 20 relatively to hollow shaft 34.

Gear portion 18 is restrained against axial longitudinal displacement by being freely fastened to gear portion 20 by means such as shouldered screws or bolts 46 having a head 48 engaging the outer surface of gear portion 18 and a cylindrical body 50 disposed with clearance in axial apertures 52 circularly disposed in gear portion 20. Each shoulder screw or bolt 46 has a reduced diameter threaded end portion 54 disposed in each of a plurality of internally threaded axial bores 56 circularly disposed in gear portion 20 and aligned one by one with a corresponding longitudinally axial aperture 52 in gear portion 18. Shoulder screws or bolts 46 are driven fast such that the shouldered end 58 of their cylindrical body 50 engages inner face 60 of gear portion 20, thus preventing gear portions 18 and 20 from being axially longitudinally movable relatively to each other. The length of the cylindrical body portions 50 of shouldered screws or bolts 46 is such as to permit enough clearance between the juxtaposed inner faces 60 of gear portion 20 and 62 of gear portion 18, thus allowing the two gear portions to be relatively displaceable angularly of a limited amount corersponding to the clearance between the inner surface of the apertures 52 in the gear portion 18 and the outer surface of the cylindrical body portion 50, apertures 52 having a slightly diameter than the outer diameter of the cylindrical body portions 50 of shouldered screws or bolts 46.

The lower end, as seen in FIG. 2, of solid shaft 30 has a diametrically oriented transverse bore 64 in which is disposed a cylindrical pin 66. Each end of the pin projects through a bore 69 in each one of the wedge blocks 68 and 70 disposed in diametrically opposed symmetrical inclined slots 72 and 74, best seen in FIG. 3, formed in the wall of hollow shaft 34. Means such as cotter pins 76 are provided through diametrically disposed apertures proximate the ends of pin 66 for retaining the pin in position in assembly.

The lower end of hollow shaft 34, as shown in FIG. 2, is provided with an internally threaded longitudinal bore 78 adapted to accept an externally threaded plug-like member or set screw 80 whose inner end face 82 engages the end of a spring assembly 84. The other end of spring assembly 84 engages the end face 86 of solid shaft 30 such that the spring assembly is normally held in compression. In the example shown, spring assembly 84 consists a spring pack formed by several symmetrically disposed super-imposed annular dished spring members 88, commonly known as Belleville spring washers, disposed in compression between the end 84 of set screw 80 and the end face 86 of the solid shaft. In this manner, the amount of spring force exerted by the spring assembly 84 against the end face 86 of solid shaft 30 can be manually adjusted by rotation of set screw 80.

Hollow shaft 34 carries a second pinion or toothed wheel, or a pulley, or any other member, as shown at 90, such that rotation of shaft 34 with respect to appropriate support bearings, not shown, corresponds to an equivalent rotation of such member 90 and vice versa, such that the assembly of member 90, shaft 34 and gear 10 forms a complete elementary unit of a gear train or drive, irrespective of whether member 90 or gear 10 is the driving or driven element.

The operation of the antibacklash gearing arrangement of the invention is obvious from the preceding description. As a result of the force exerted by spring assembly 84, solid shaft 30 tends to be displaced upwardly, as seen in FIG. 2, and the upward longitudinal displacement of the shaft is transformed into an angular motion of solid shaft 30 with respect to hollow shaft 34 in view of the connection between the two shafts by means of pin 66 supporting wedge blocks 68 and 70 which are forced to ride in the inclined opposed symmetrical slots 72 and 74 defining a partial helicoidal ramp. Consequently, under the influence of the biasing force of spring assembly 84, shaft 30 is subjected to a limited angular motion with respect to hollow shaft 34 around the common axis of the shafts. Gear portion 18, mounted by means of sliding spline assembly 26–28 upon the end of shaft 30, is thus urged toward angular displacement with respect to gear portion 20 such that its toothed portions 22 are no longer aligned one by one with tooth portions 24 of gear portion 20. The angular separation is of course limited, as best shown in FIG. 4, to an amount such that the tooth portions 22 and 24 in each pair are offset sufficiently to fill the intertooth space between consecutive teeth 14 of toothed member 16. Because the angle of inclination of each slot 72 or 74 with respect to the shaft common axis is preferably less than 45°, any tendency for the tooth portions 22 and 24 to be forced back into realignment is prevented by the frictional engagement of the wedge blocks 68 and 70 with the surface of the inclined slots 72 and 74, thus causing an irreversible action of the backlash takeup mechanism of the invention. This wedging action, favoring angular separation of the tooth portions in one direction but inhibiting relative motion in an opposite direction, thus continuously provides an automatic backlash takeup corresponding to the amount of wear of teeth 14 and 12 meshing with each other and provides a gear drive system having a controlled amount of separation between the tooth portions 22 and 24 which remains the same irrespective of the direction of drive of the gear train and irrespective of the direction and change of direction of the loads imposed thereon. Furthermore, the force tending to angularly displace gear portions 18 and 20 relatively to each other, may be adequately tailored to any appropriate amount of preload according to biasing force adjustably determined by set screw 80. By utilizing rigid shafting which minimizes torsional windup, the arrangement of the invention provides positive backlash control for high load applications.

Having thus described the antibacklash gearing arrangement of the present invention by means of an illustrative example thereof, variations whereof will become apparent to those skilled in the art, what is sought to be protected by United States Letters Patent is as follows.

We claim:

1. In a gear drive having a gear provided with teeth adapted to mesh with the teeth of a thoothed member, an antibacklash improvement comprising:

said gear being made of two axially aligned gear portions each operatively meshing with said toothed member;

a hollow shaft member having an end rigidly supporting one of said gear portions for rotation in unison therewith;

an internal shaft member coaxially disposed in said hollow shaft member and having an end adapted to support the other of said gear portions for rotation in unison therewith by way of a longitudinally axially slidable spline arrangement;

means for maintaining said gear portions in close juxtaposition whilst permitting limited angular motion therebetween;

means urging said hollow shaft and said internal shaft in relative angular displacement for angularly relatively urging said gear portions in a first direction; and wedge means interconnecting said hollow shaft and said internal shaft for preventing relative angular displacement therebetween in an opposite direction.

2. The improvement of claim 1 wherein the means urging said hollow shaft and said internal shaft in relative angular displacement comprises:

a pair of diametrically opposed symmetrically inclined slots in said hollow shaft;

a bearing block in each of said slots;

a pin supported at each end in one of said bearing blocks and disposed in a diametrical aperture in said internal shaft; and spring means axially biasing said internal shaft relatively to said hollow shaft;

whereby relative axial displacement of said shafts results in relative angular displacement of said gear portions.

3. The improvement of claim 2 wherein said slots are inclined to an angle of less than 45° relatively to the common axis of said shafts.

4. The improvement of claim 2 further comprising:
means for manually adjusting the force exerted by said spring means.

5. The improvement of claim 4 wherein said means for manually adjusting the force exerted by said spring means comprises:
an internally threaded portion in the other end of said hollow shaft; and an externally threaded plug-like member threadable in said internally threaded portions in the end of said hollow shaft and having an end engaging an end of said spring means, said spring means being normally disposed for compression between the end of said plug like member and the other end of said internal shaft.

6. An improved gear member adapted for positive meshing with an appropriate toothed member irrespective of the direction of relative drive of the members, said gear member comprising:
coaxial shaft members disposed one within the other for independent angular and axial displacements;

a pair of coaxial gear portions disposed side by side for simultaneous meshing with said toothed member;

means fastening said gear portions one to the other for preventing relative axial displacement therebetween whilst permitting limited relative angular displacement;

means rigidly mounting one of said gear portions on an end of one of said shaft members;

means mounting the other of said gear portions on an end of the other of said shaft members for rotational connection therewith whilst permitting axial relative displacement therebetween;

means dependent from said shaft members for angularly urging one of said shaft members relatively to the other in a predetermined direction; and further means dependent from said shaft members for preventing relative angular rotation thereof in an opposite direction.

7. The improved gear member of claim 6 wherein the means dependent from said shaft members for angularly urging one of said shaft members relatively to the other comprises:
a pair of diametrically opposed symmetrically inclined slots in one of said shaft members disposed surrounding the other;

a bearing block in each of said slots;

a pin supported at each end in one of said bearing blocks and disposed in a diametrical aperture in the other of said shaft member; and spring means axially biasing one of said shaft members relatively to the other;

wherein relative axial displacement of said shaft members results in relative angular displacement of said gear portions.

8. The improvement of claim 7 wherein said slots are inclined to an angle of less than 45° relatively to the axis of said shaft members.

9. The improvement of claim 7 further comprising:
means for manually adjusting the force exerted by said spring means.

References Cited

UNITED STATES PATENTS

| 3,020,775 | 2/1962 | Musser | 74—440 |
| 3,138,035 | 6/1964 | Silvaslian | 74—440 |
| 3,174,356 | 3/1965 | Michalec | 74—440 |
| 3,296,881 | 1/1967 | Seabeck | 74—440 |

FRED C. MATTERN, Jr., *Primary Examiner.*

LEONARD H. GERIN, *Assistant Examiner.*